United States Patent [19]

Robarge

[11] 4,041,539
[45] Aug. 9, 1977

[54] TAPE HEAD SHIFT APPARATUS FOR MULTI-TRACK TAPE PLAYER

[75] Inventor: Wilbur A. Robarge, Kokomo, Ind.

[73] Assignee: General Motors Corporation, Detroit, Mich.

[21] Appl. No.: 714,586

[22] Filed: Aug. 16, 1976

[51] Int. Cl.² .................. G11B 21/08; G11B 5/55
[52] U.S. Cl. .................................................. 360/106
[58] Field of Search ............................. 360/106, 78

[56] References Cited

U.S. PATENT DOCUMENTS

| 3,575,422 | 4/1971 | Peltz et al. | 360/106 |
|---|---|---|---|
| 3,663,022 | 5/1972 | Ban | 360/106 |
| 3,921,216 | 11/1975 | Wada | 360/106 |
| B 487,411 | 2/1976 | Nishinakagawa | 360/106 |

Primary Examiner—Robert S. Tupper
Attorney, Agent, or Firm—Robert M. Sigler

[57] ABSTRACT

In a multi-track tape player, a motor driven capstan normally drives tape past a tape head shiftable between tape tracks by a rotatable cam. An idler member is actuable to engage a driving member on the capstan to be positively rotatably driven thereby through a predetermined rotational angle and then disengage. Geneva gear apparatus connects the idler member to the rotatable cam and comprises a geneva drive member with a circular cam having a concave excluded sector and a pin and a geneva driven member having a wing for each tape track, each wing having a concave peripheral surface for normal engagement with the circular cam to hold the cam in certain rotational position and a slot between each pair of adjacent wings adapted to be engaged by the pin upon rotation of the geneva drive member to rotate the cam to its next position and thereby shift the tape head between tracks.

1 Claim, 3 Drawing Figures

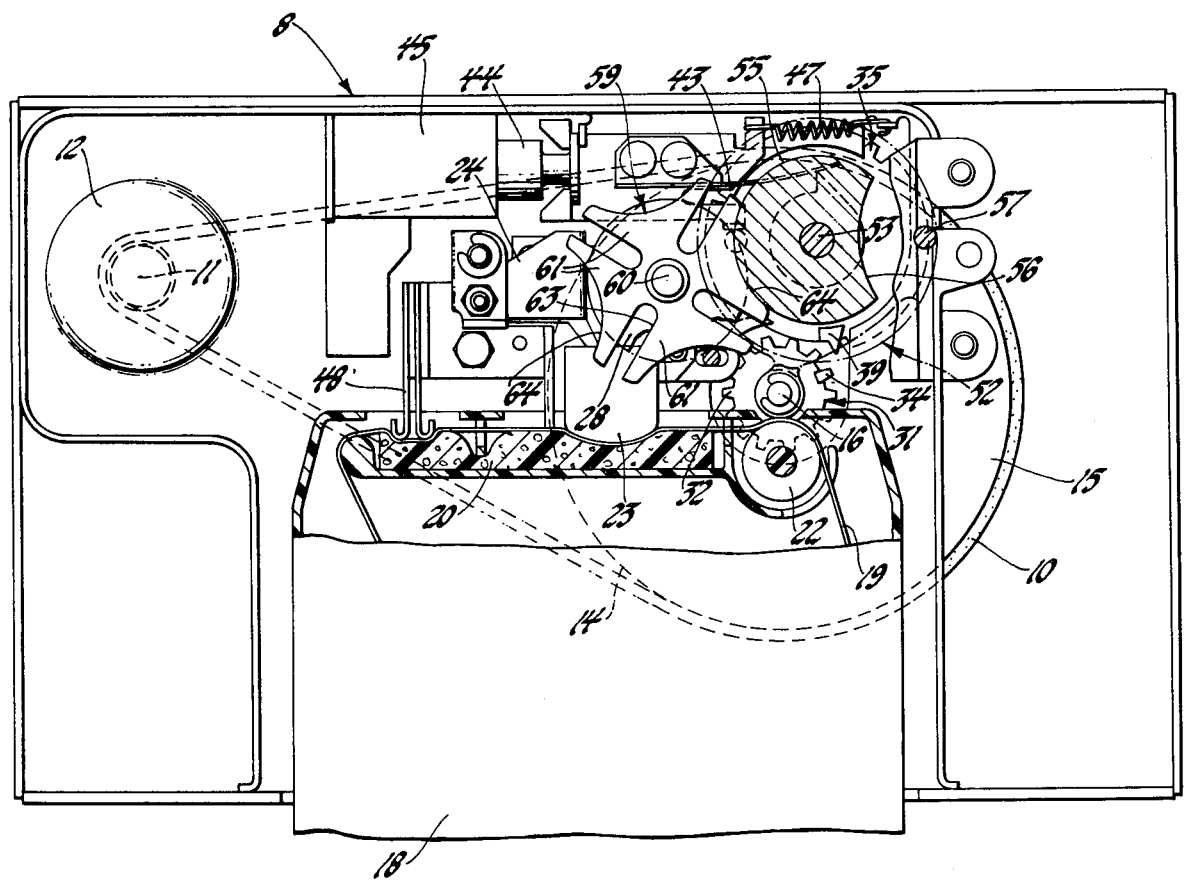

TAPE HEAD SHIFT APPARATUS FOR MULTI-TRACK TAPE PLAYER

SUMMARY OF THE INVENTION

This invention relates to apparatus for shifting the magnetic tape head of a multi-track tape player between tracks, and particularly to such apparatus which is actuable to harness the power of the capstan drive motor to accomplish the shift of the tape head. It has been found advantageous in tape machines of the type which play a multi-track, endless tape housed in a cartridge to include apparatus which is responsive either to an operator or to signal means on the tape to engage the tape head shifting cam to the capstan drive motor in some way to provide a rotation of the former by the later through a certain angle of rotation. In order to operate correctly through many cycles of tape head shifting, the apparatus must restrict the cam from rotation when the tape head is not to be shifted and rotate the cam precisely to the next desired position each time tape head indexing is initiated. Prior art tape head shifting mechanisms have not always performed satisfactorily in this regard.

This invention comprises apparatus including an idler actuable to engage the capstan for rotation through a predetermined rotational angle, a geneva drive member on the idler and a geneva driven member fixed to the camshaft. The geneva drive member has a circular cam with a concave sector and drive pin; and the geneva driven member has a plurality of wings, each of which has a concave peripheral surface to engage a circular cam and each adjacent pair of which are separated by a radial slot which is engaged by the driving pin with geneva drive member rotation to rotate the driven member and cam to another position in which the next wing engages the circular cam.

Further details and advantages of this invention will be apparent from the accompanying drawings and following description of a preferred embodiment.

DESCRIPTION OF A PREFERRED EMBODIMENT

Figure 1:
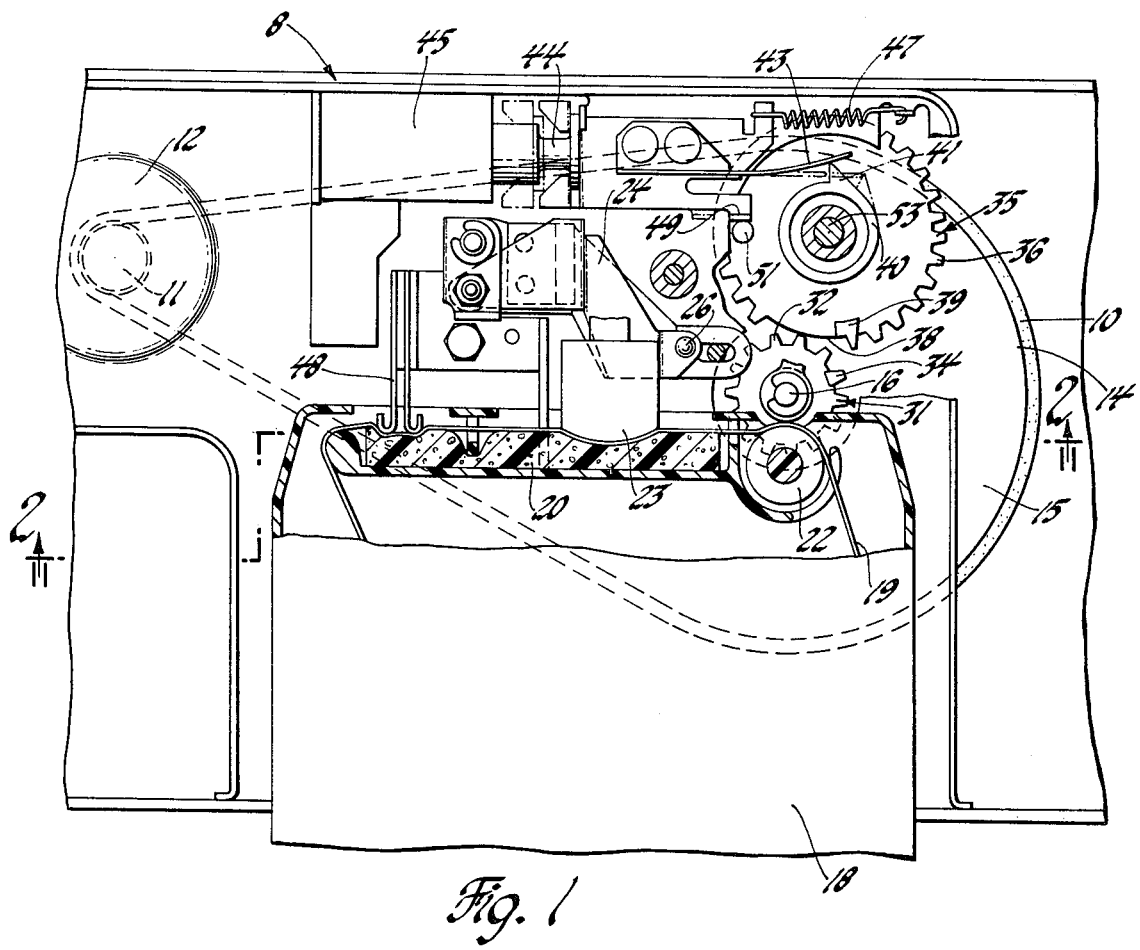
FIG. 1 shows a top view, partially cut away, of a tape playing and tape head indexing mechanism according to this invention.
Figure 2:
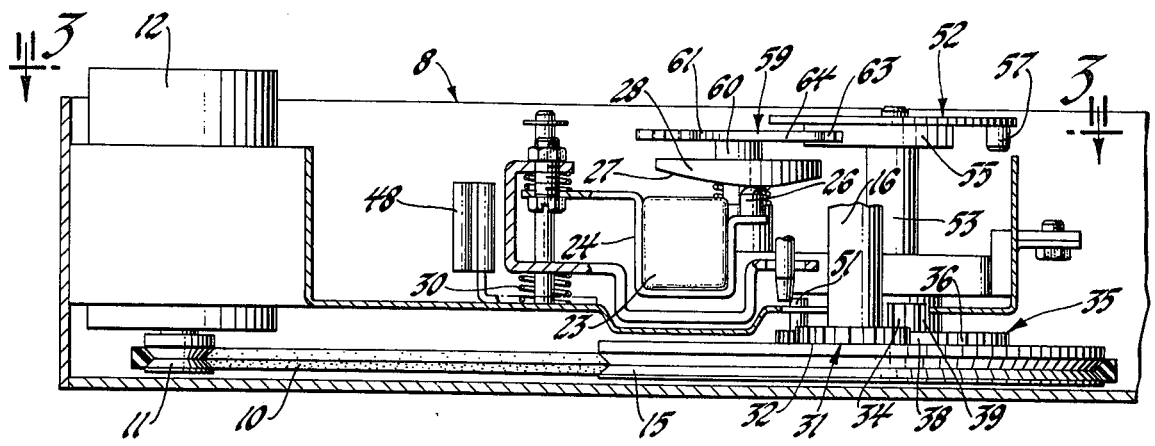
FIG. 2 shows a view along line 2—2 in FIG. 1.

Referring to FIGS. 1 and 2, a tape playing machine 8 has a flexible belt 10 providing coupling between the output pulley 11 of a DC motor 12 and the perimeter pulley 14 of a flywheel 15. A drive capstan 16 is attached to and turned by flywheel 15 to drive a magnetic recorded tape.

FIG. 1 shows a cartridge 18 containing a tape 19 suitable for driving by capstan 16. Such cartridges, well known in the art and including the common eight-track cartridge, contain an endless loop of tape 19, one portion of which is strung along soft foam backing 20 and around an idler wheel 22. When cartridge 18 is correctly inserted into machine 8, tape 19 is pinched between idler wheel 22 and capstan 16 to be driven by capstan 16 at a substantially constant speed.

A tape playing head 23 is held adjacent tape 19 as tape 19 is driven past it by capstan 16. Tape head 23 in this embodiment can be any of the many known magnetic tape heads used in tape playing machinery. The electrical output signal or signals from tape head 23 are provided to amplifying and sound reproducing apparatus, not shown.

Tape 19 is divided across its width into a plurality of tracks which run parallel around the full length thereof in an effort to increase the effective playing time of the tape 19. Tape head 23 therefore is mounted on a bracket 24 which is vertically movable in FIG. 2 to shift its magnetically sensitive region between tape tracks. A cam follower 26 tracks on the lower surface 27 of a cam 28 which is rotatable about a vertical axis. Bracket 24 is biased upward by a spring 30, whereby cam follower 26 is biased to follow surface 27 of cam 28 up and down as cam 28 rotates. In the case of an eight-track stereo tape cartridge and playing mechanism, tape head 23 has four distinct playing positions and lower surface 27 has a distinct vertical level for each of these positions, spaced 90° from each other around the cam with appropriate ramps therebetween.

It is desirable to be able to shift tape head 23 between tape tracks by rotating cam 28 from one position to the next while using the power provided by DC motor 12. Therefore it is necessary to provide apparatus for temporarily engaging flywheel 15 to cam 28 to initiate rotation thereof and disengage flywheel 15 from cam 28 when the proper rotation has been completed. In particular, the reliability of the apparatus wil be enhanced if that mechanism is adapted to ensure that cam 28 is rotated exactly the proper amount during each such track shifting rotation over many repetitions thereof and is securely held against accidental rotation between said track shift rotations.

Referring again to FIGS. 1 and 2, a driving spur gear 31 is fixed to capstan 16 and flywheel 15 for rotation therewith. Driving spur gear 31 is provided with normal teeth 32 around its periphery as well as a special timing tooth 34 projecting upward in FIG. 2 above the other teeth 32. A driven spur gear or idler gear 35 with teeth 36 is disposed adjacent driving spur gear 31 so that if teeth 36 were continuous about the periphery of idler gear 35, they would engage teeth 32 of spur gear 31. However, a number of adjacent teeth 36 are removed to form an excluded sector 38 on idler gear 35 which is normally disposed adjacent spur gear 31 to prevent engagement thereof. Another special timing tooth 39 projects upward and outward from idler gear 35 near one end of the excluded sector 38.

Above idler gear 35, and affixed thereto for rotation therewith, is a gear 40 with a single tooth 41. Tooth 41 is engageable by a pawl 43 which is resiliently bendable when pushed from the side but sufficiently stiff to resist bending from a force on the end. Pawl 43 is attached to the plunger 44 of a solenoid 45 and is thus linearly reciprocable past or into tooth 41. A tension spring 47 biases plunger 44 out of solenoid 45; and the supply of an actuating current to solenoid 45 pulls plunger 44 against the bias of the spring 47. Actuating current for solenoid 45 is supplied by standard switching means, not shown, in response to actuation by an operator or the passage of a specially coated section of tape 19 past a track shift signal pickup 48.

Also attached to plunger 44, and movable therewith, is a stop 49 which, when the solenoid is not actuated, engages a post 51 projecting upward from idler gear 35. With actuation of solenoid 45, stop 49 is pulled out of engagement with post 51 to allow rotation of idler gear 35.

Up to this point, the apparatus described has been old and well known in the prior art. All that would be necessary to complete the mechanism is an additional set of gears, a driving gear fixed to the idler gear and a driven gear fixed to the cam, in a ratio of one to four to provide one quarter rotation of the cam for each rotation of the idler gear.

This invention, however, provides a geneva drive member 52 attached to idler gear 35 for rotation therewith through an idler shaft 53. Geneva drive member 52, shown in FIG. 3, has a circular cam 55 with a concave excluded sector 56. Geneva drive member 52 also has a post or pin 57 adjacent excluded sector 56.

Figure 3:
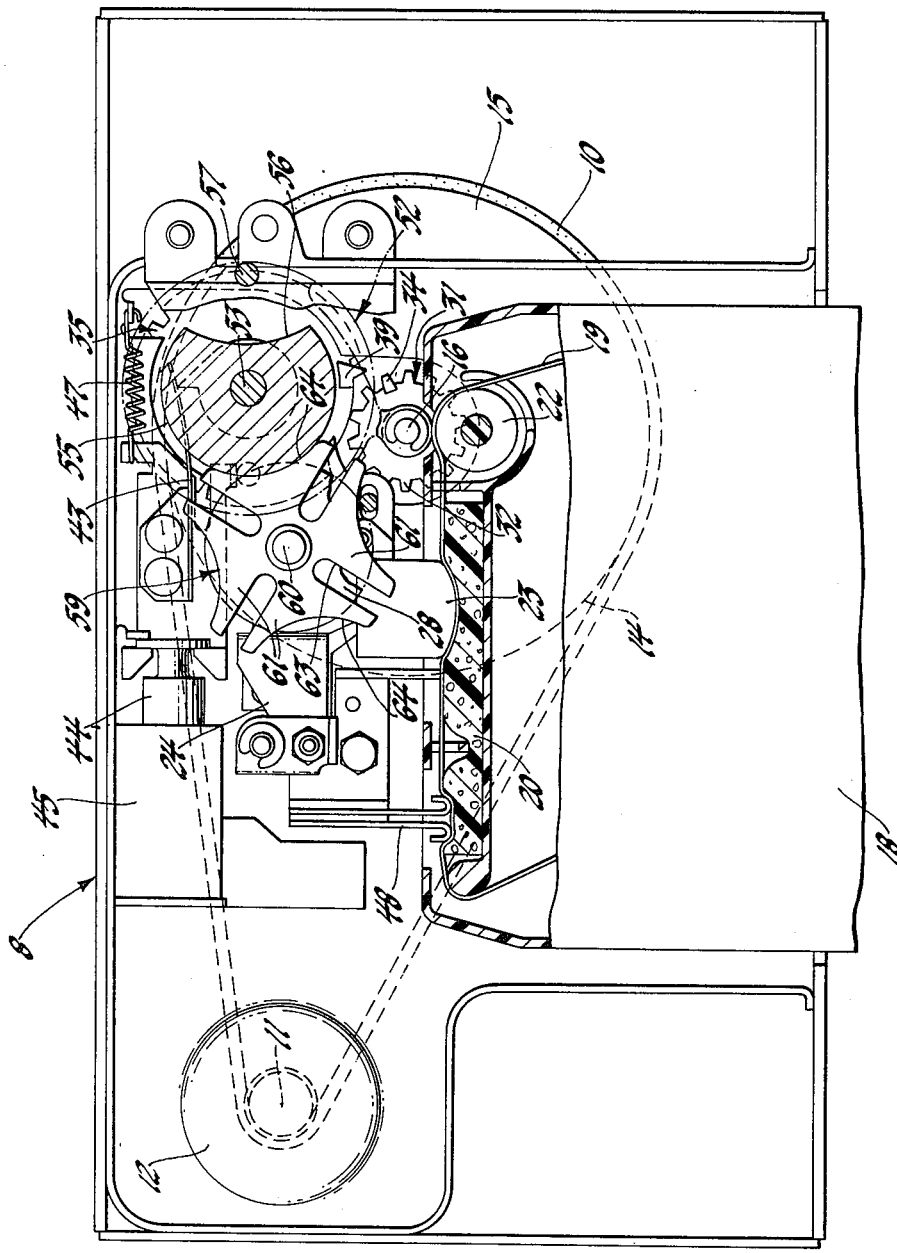
FIG. 3 shows a view along line 3—3 in FIG. 2.

A geneva driven member 59 is fixed to cam 28 for rotation therewith through a shaft 60 and comprises four wings 61 spaced 90° apart and separated by radial slots 63 wide enough to allow the entrance of pin 57. Each wing 61 has a concave peripheral surface 64 with a radius substantially the same as that of circular cam 55. Geneva members 52 and 59 are disposed as shown in FIG. 3 with the concave peripheral surface 64 of one of the wings 61 in engagement with circular cam 55. This is the normal position of geneva members 52 and 59 when the tape head is not being shifted between tracks, geneva driven member 59 being held firmly against rotation to provide a predictable and unchanging position for cam 28 and thus for tape head 23.

In operation, motor 12 turns flywheel 15 through belt 10 to turn capstan 16 and pull tape 19 past tape head 23. During this tape playing mode of operation, the apparatus is disposed as seen in the Figure. Although spur gear 31 rotates with flywheel 15, excluded sector 38 of teeth 36 is disposed adjacent spur gear 31; and idler gear 35 is thus not engaged. Stop 49 and post 51 prevent movement of idler gear 35 in the forward or clockwise direction as seen in FIG. 1. If idler gear 35 rotates backward or counterclockwise in FIG. 1, it will be engaged temporarily by spur gear 31 and moved forward out of engagement once again. This small movement of idler gear 35 is not transmitted through the geneva gear apparatus to cam 28 or tape head 23, which remain locked precisely in position for optimum performance.

This can be seen in FIG. 3, since even if idler gear 35 has a small amount of rotational movement, circular cam 55 will only slide back and forth across concave peripheral surface 64 of wing 61 and cam 28 will be held rigidly against rotation.

Upon actuation of solenoid 45, plunger 44 pulls pawl 43 past tooth 41, whereupon it snaps into a straight configuration as shown by the broken lines in FIG. 1. Stop 49 is also pulled away from post 51. Solenoid 45 is then deactuated; and spring 47 pulls pawl 43 back against tooth 41 to rotate idler gear 35 forward through a small angle, the angle nevertheless being sufficient to rotate timing tooth 39 into a position where it is caught and engaged by timing tooth 34 upon its next rotation with spur gear 31. Timing teeth 34 and 39 cause a further forward rotation of idler gear 35 which is sufficient to mesh teeth 36 of idler gear 35 with teeth 32 of spur gear 31. Since, in the initial rotation of idler gear 35, post 51 moved past the returning stop 49, idler gear 35 is free to complete one full rotation back to the position shown in FIG. 1 where excluded sector 38 disengages it from spur gear 31 and its further rotation is stopped by the engagement of post 51 with stop 49.

Referring to FIG. 3, geneva drive member 52 completes one full revolution with idler gear 35. During rotation of geneva drive member 52, no rotation of geneva driven member 59 is caused until pin 57 is rotated into one of the slots 63 at the same time that excluded concave sector 56 rotates into a position adjacent wing 61. Excluded concave sector 56 allows rotation of geneva driven member 59; and pin 57 causes such rotation through one-quarter turn, whereupon pin 57 moves out of slot 63 and circular cam 55 engages the new wing 61. The one-quarter turn revolution of geneva driven member 59 causes an equivalent rotation of cam 28 with a consequent shift in position of tape head 23 to play a new track of tape 19.

It will be observed by those skilled in the art that the configuration of some of the elements of the invention can be changed from that appearing in the Figures within the scope of the invention. The number of wings 61 on geneva driven member 69 is dictated by the number of tape head positions and therefore the number of positions for cam 28. However, the geneva drive member could have more than one excluded concave sector 56 and pin 57, provided that idler gear 35 was provided with more than one tooth 39, excluded sector 38, tooth 41 and post 51. In that case, the idler gear 35 and geneva drive member 52 would not perform a full revolution for each tape head shift, but would perform one-half or perhaps one third revolution, depending upon the configuration chosen. Such variations are, of course, included within the scope of this invention, as are many other variations which will occur to those skilled in the art. Thus this invention should be limited only by the claim which follows.

The embodiments of the invention in which an exclusive property or privilege is claimed are defined as follows:

1. In a multi-track tape player including a magnetic head shiftable between tape tracks, apparatus for continuously driving the tape past the magnetic head and intermittently shifting the magnetic head between tracks, the apparatus comprising, in combination:

a tape-driving capstan; motor means for continuously driving the capstan; a rotatable first cam; a cam follower connected to the magnetic head for co-movement therewith and biased to follow the first cam and thus shift the magnetic head between tape tracks with cam rotation; a driving member fixed to the capstan for rotation therewith; an idler member being actuable to engage the driving member to be positively rotatably driven thereby through a predetermined rotational angle and, having been so driven, disengage from the driving member; solenoid means selectively actuable to actuate the idler member; and geneva gear apparatus connecting the idler member to the first cam, the geneva gear apparatus comprising a geneva drive member being connected to the idler member for rotation therewith and having a circular second cam with a concave excluded sector and a pin adjacent the excluded sector and further comprising a geneva driven member having a plurality of wings, one wing for each tape track, each wing having a concave peripheral surface matching the second cam and being separated from adjacent wings by radial slots, the geneva driven member being fixed to the first cam for rotation therewith and positioned adjacent the driving member with a wing normally engaging the second cam to prevent rotation thereof while engaged and a slot adjacent the wing being adapted to receive the pin during rotation of the driving member to rotate the next adjacent wing into engagement with the second cam and thus rotate the first cam to shift the magnetic head between tape tracks.

* * * * *